A. BOYSEN.
SERVING TABLE.
APPLICATION FILED AUG. 23, 1920.

1,391,755.

Patented Sept. 27, 1921.

Inventor
August Boysen
By Hardway & Cathey
Attorneys.

UNITED STATES PATENT OFFICE.

AUGUST BOYSEN, OF HOUSTON, TEXAS.

SERVING-TABLE.

1,391,755.  Specification of Letters Patent.  Patented Sept. 27, 1921.

Application filed August 23, 1920. Serial No. 405,342.

*To all whom it may concern:*

Be it known that I, AUGUST BOYSEN, a citizen of the United States, residing at Houston, in the county of Harris and State of Texas, have invented certain new and useful Improvements in a Serving-Table, of which the following is a specification.

This invention relates to new and useful improvements in a serving table.

One object of the invention is to provide a table of the character described which is specially adapted for use in serving cold drinks, light lunches and the like to customers seated in an automobile or other similar vehicle.

Another object of the invention is to provide a table of the character described which is adjustable so that it may be accommodated to vehicles of different heights.

A further feature of the invention resides in the provisions of a table which is easily portable so that it may be attached to and removed from the vehicle in serving the customers therein.

With the above and other objects in view the invention has particular relation to certain novel features of construction, arrangement of parts and use, an example of which is given in this specification and illustrated in the accompanying drawings, wherein:—

Figure 1:
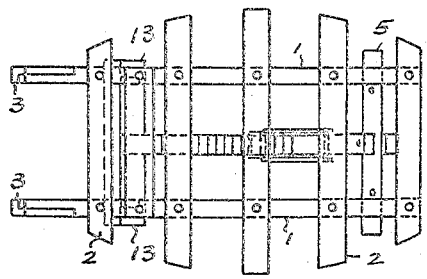
Figure 1 shows a plan view of the table.

Referring now more particularly to the drawings wherein like numerals of reference designate similar parts in each of the figures, the numerals 1, 1 designate the side members of the frame-work whereon the table proper is secured. As shown, the cross slats 2 are secured to the frame-work to form a suitable support for the serving tray. At one end the side members have the depending stops 3, 3 which engage over the side of the vehicle body 4, and at the other end of the frame-work there is a transverse shaft 5 which has bearings in the side members 1. Fixed to the shaft, at its center, there is a bar 6 whose front side is formed into a ratchet face 7, and slidably secured to this bar there is a supporting leg 8 whose lower end carries a suitable supporting foot 9. The leg 8 has a clevis 10 pivoted thereto, which surrounds the bar and is adapted to engage in the teeth of the ratchet face 7, and there is a bearing 11 also secured to said leg through which the bar 6 slides. It is obvious that by lifting the clevis 10 out of engagement with the ratchet, the bar 6 may be adjusted up or down relative to the leg 8 so as to bring the table level with respect to the vehicle, and while serving the foot 9 usually rests upon the running board 12 of the vehicle. There are depending lugs 13, 13 carried by the side members 1, and spaced from the stops 3 and adapted to engage against the outer side of the vehicle body to securely hold the table against slippage.

Figure 2:
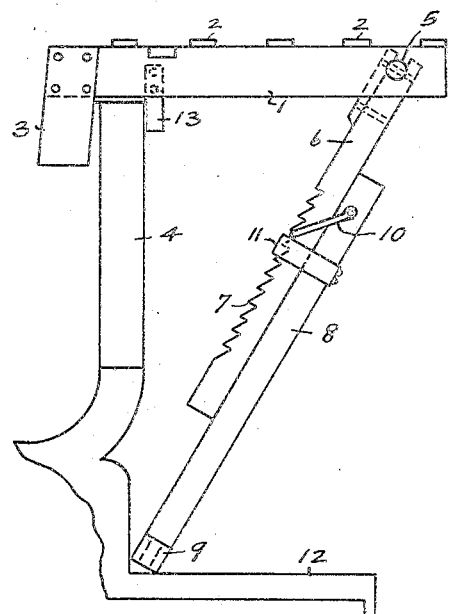
Fig. 2 shows a side elevation thereof.
Figure 3:
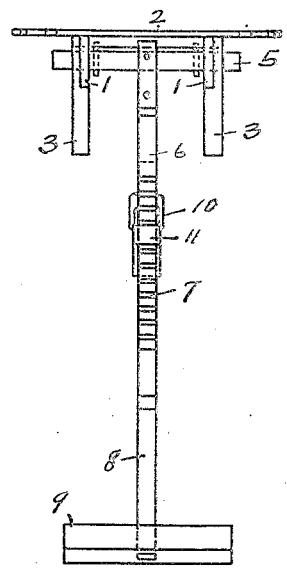
Fig. 3 shows a front view.

While serving customers the table is arranged, as shown in Fig. 2, and supports the serving tray and other articles used in serving, and after the customers have been served, the table, being light, can be readily removed from the vehicle.

What I claim is:—

1. A device of the character described consisting of a table which includes a supporting framework, a rod rotatably mounted at one end of said framework, a supporting leg secured to said rod at an intermediate point, and depending therefrom, said leg being formed of two sections, a bearing secured to one section and through which the other section slides, a clevis carried by the first mentioned section, and embracing the other section, the last named section being formed with ratchet teeth with which said clevis engages, and depending stops carried by the end of said table opposite said rod and adapted for engagement over the side of a vehicle body.

2. In a device of the character described, a table including a supporting frame work, a supporting rod running through one end of said table, a supporting leg depending from the center of said rod, and revolubly secured thereto, and adjustable lengthwise, relative to the table, and depending stops carried by the other end of said table, and adapted for engagement over the side of a vehicle body, said leg being formed of a hinged member having a smooth, and a ratchet side, and a member slidably secured thereto by a bearing and a clevis.

In testimony whereof I have signed my name to this specification in the presence of two subscribing witnesses.

AUGUST BOYSEN.

Witnesses:
 JNO. B. OLIVER,
 WM. A. CATHEY.